March 7, 1967 — A. M. SQUIRES — 3,307,350
TOP HEAT POWER CYCLE
Filed July 2, 1964 — 3 Sheets-Sheet 1

INVENTOR.
ARTHUR M. SQUIRES
BY
ATTORNEY

INVENTOR.
ARTHUR M. SQUIRES

ATTORNEY

United States Patent Office 3,307,350
Patented Mar. 7, 1967

3,307,350
TOP HEAT POWER CYCLE
Arthur M. Squires, 245 W. 104th St.,
New York, N.Y. 10025
Filed July 2, 1964, Ser. No. 380,005
20 Claims. (Cl. 60—39.05)

This invention pertains to the production of power from readily available fuels such as heavy fuel oil, coal, distillate oils, or natural gas.

An object of the invention is to provide an improved power cycle of unusually high thermal efficiency and adapted for incorporation in power units of gigantic capacity such as are required by the great cities of the world.

Another object of the invention is to provide an improved cycle in which discharges of dirt, fine dust particles, sulfur dioxide and other noxious gases are eliminated.

Another object of the invention is to provide an improved cycle using a condensing turbine which operates at a substantially higher pressure than the condensing turbine of the conventional Rankine steam cycle, yet without loss of cycle efficiency on that account.

This invention is an improvement of the top heat power cycle disclosed and claimed in my co-pending application Ser. No. 337,900, filed Jan. 15, 1964. An object of the present invention is to provide an improved cycle requiring less equipment than that of the earlier top heat cycle, and in particular requiring no equipment which must operate at high vacuum.

Another object of the invention is to provide a modified top heat cycle especially suited for use in adapting an existing steam-power station in such a way that steam from the station's boiler may be used in the top heat cycle.

Another object of the invention is to provide a modified top heat cycle especially suited for use in adapting an existing steam-power station to operate at considerably below 10 percent load factor and to meet peaks in demand of the order of two times or more greater than the present output of the station.

Another object of the invention is to provide a modified top heat cycle especially suited for installation together with nuclear steam-power plant intended to supply base-load electricity demand, use of the top heat cycle coming into play during peaks in electricity demand, this use affording an increase in electricity output of the order of two times or more.

In my top heat cycle, heat is added to high-pressure steam directly in form of the products of combustion between a clean fluid fuel and oxygen. Co-pending application Ser. No. 337,900 teaches both methods of obtaining a clean fluid fuel from a "dirty" fuel, such as coal or oil, and also methods of obtaining oxygen from air, while incorporating said methods into the top heat cycle.

In some embodiments of the top heat power cycle, a clean fluid fuel containing the element carbon is used in the aforesaid combustion with oxygen, and the high-pressure gases which result from combining the products of this combustion with steam generally contain a major portion of steam and a minor portion of carbon dioxide. These gases are expanded in a series of power-developing expansion turbine stages which terminate in a stage discharging gases at a pressure which can be maintained in a condenser of economic size with use of the available atmospheric cooling water. This pressure is generally in the range between about 0.5 to about 2.0 pounds per square inch absolute (p.s.i.a.). Carbon dioxide is compressed from the condenser to the atmosphere by a series of vacuum pump stages.

In general, it is desirable, at a number of intermediate points in the above-described expansion process, to employ additional combustion steps using clean fluid fuel and oxygen to reheat the gases. In this way, the temperature of the gases can generally be kept at a high level through a large part of the expansion process.

In general, also, it is desirable to cool the gases by indirect heat exchange following a stage of the expansion process which discharges the gases at approximately atmoshperic pressure. The heat derived from this indirect heat exchange is usefully employed by the cycle; for example, this heat may be used as part of the heat needed to raise high-pressure steam. Following the indirect heat exchange, the gases are expanded to the pressure of the condenser.

The top heat cycle, as briefly described above and as set forth in detail in my co-pending application Ser. No. 337,900, affords a power cycle of unusual economy and outsandingly high thermal efficiency.

I have discovered a way to improve the top heat cycle, when a carbonaceous fluid fuel is employed in the oxygen flame, without relinquishing or forfeiting any of the cycle's advantages of economy or efficiency. My new discovery affords not only a lowering of equipment cost but also an increase in thermal efficiency of conversion of fuel to electricity.

My improvement consists of employing a second power cycle in cooperation with the top heat cycle. This second power cycle is of the Rankine variety, and I call this second power cycle a bottom heat power cycle, since it receives heat at a relatively low temperature by comparison with temperatures attained in the top heat cycle. The bottom heat power cycle discharges heat to atmospheric cooling water (or, if desired, to atmospheric air). I refer to the fluid used in the bottom heat cycle as "bottoming-fluid."

To be suitable for use as a bottoming-fluid, a substance should have a critical temperature above about 200° F., but preferably not above about 500° F. It should not freeze at temperatures ordinarily encountered in atmospheric cooling water (or in atmospheric air, except under severe weather conditions). Thus, a bottoming-fluid can exist in the liquid state between about 60° F. and about 200° F. Its vapor pressure at temperatures toward the lower end of this temperature range should not be extremely low, and should preferably be in the neighborhood of atmospheric pressure or above. Its vapor pressure at temperatures toward the upper end of the foregoing temperature range should not be extremely high, and should preferably be not greater than 100 atmospheres.

Examples of substances generally suitable for use as a bottoming fluid are: trichloromonofluoromethane ("Freon–11" or "F–11"), ammonia, sulfur dioxide, trichlorotrifluoroethane ("Freon–113" or "F–113"), dichloromonofluoromethane ("Freon–21" or "F–21"), dichlorotetrafluoroethane ("Freon–114" or "F–114"), dichlorodifluoromethane ("Freon–12" or "F–12"), perfluorocyclobutane ("Freon–C318" or "F–C318"), and monochlorodifluoromethane ("Freon–22" or "F–22"). I have found that the pressure-enthalpy-entropy relationships for trichloromonofluoromethane (F–11) are such that particularly satisfactory results could be obtained with use of this substance. I have found that results obtainable with use of ammonia were nearly as good, and ammonia has the advantage of having a much higher speed of sound, a factor which eases the problem of expansion-turbine design. Among the "Freons," F–22, F–21, and F–12 have the advantage of exhibiting generally higher speeds of sound; but in examples which I have calculated to date, the pressure-enthalpy-entropy relationships for these substances did not lend themselves to achieving as good results as may be obtained with F–11.

In my bottom heat power cycle, working in cooperation with my top head power cycle, bottoming-fluid receives heat by indirect heat exchange from a mixture of steam and carbon dioxide emerging at substantially atmospheric pressure from the top heat power-developing turbine or turbines. In this heat exchange, steam is condensed to water, and bottoming-fluid is heated and vaporized. Gasiform bottoming-fluid is then expanded through a power-developing turbine to the pressure which can be maintained in a condenser of economic size with use of the available atmospheric cooling water (or of atmospheric air, if desired). Liquiform bottoming-fluid is then pumped to the pressure of the aforesaid indirect heat exchange with steam and carbon dioxide. Since steam has been condensed to water at substantially atmospheric pressure, no pump is needed to discharge carbon dioxide to the atmosphere.

If ultra-high temperatures are used in the top heat cycle, I believe there is advantage in carrying out the aforesaid indirect heat exchange at a steam-and-carbon-dioxide pressure somewhat below atmospheric, but still substantially higher than would be used in a condenser if steam were to be condensed against the available atmospheric cooling water. In this case, a pump is needed to discharge carbon dioxide to the atmosphere; but the pump is not nearly as large, and does not consume nearly as much power, as the pump which would be needed in the top heat cycle of my application Ser. No. 337,900, above referred to, in which steam and carbon dioxide are expanded to the low pressure of a condenser against atmospheric cooling water.

An advantage of employing the bottom heat cycle in conjunction with the top heat cycle is a substantial lowering of capital cost. This comes about as follows:

(a) Vacuum pumps are eliminated (or substantially so).

(b) With a suitable choice of bottoming-fluid, the condensing turbine is far smaller, since it handles a far smaller valumetric throughput of gas.

(c) On balance, there is a worthwhile saving in the cost of heat-exchangers. The bottoming-fluid condenser is far smaller than the condenser of the top heat cycle of my application above referred to and can be made of cheaper materials. [The condenser of the unmodified top heat cycle must use stainless-steel tubing, on account of the corrosive power of liquid water in the presence of carbon dioxide. So-called "duplex" tubing might often be preferred for the condenser of an unmodified top heat plant, such tubing comprising an inner surface of copper and an outer surface of stainless steel.] Although the heat-exchangers in which steam is condensed against bottoming-fluid must be made of stainless steel, they can be far smaller than the condenser of an unmodified top heat cycle on account of the higher pressure level.

A second and surprising advantage of employing the bottom heat cycle in conjunction with the top heat cycle is an increase in cycle efficiency.

The use of a "bottoming" cycle, in conjunction with the ordinary Rankine steam cycle, has been proposed as a means of reducing capital cost (by decreasing the size of the condensing turbine and the size of the condenser). However, the use of a "bottoming" cycle in conjunction with the ordinary Rankine steam cycle inevitably leads to a loss of cycle efficiency, on account of a loss of availability of heat for production of work due to the temperature difference required to transfer heat from condensing steam to the "bottoming" fluid. A measure of this loss of "availability" is the area excluded from the temperature-entropy diagrams traced out by steam and by the "bottoming" fluid, said area constituting a horizontal strip having the height of the temperature difference used for transfer of heat. "Bottoming" cycles have not found favor with the power industry, since the loss of cycle efficiency more than offsets the gain on account of reduction in plant capital cost.

The increase in cycle efficiency when the bottom heat cycle is employed in conjunction with the top heat cycle is primarily a consequence of the fact that the loss of heat "availability" for work (as displayed on the temperature-entropy diagram) is offset by elimination of the power needed to drive the carbon dioxide vacuum pumps.

I have found that a bottoming-fluid condensing turbine can produce more work than the net work of the low-temperature steam-and-carbon-dioxide turbine, diminished by the work needed for the vacuum pumps, of the unmodified top heat cycle of my pending application above referred to. Furthermore, substantially all steam in the steam-and-carbon-dioxide mixture emerging from the top heat turbine can be condensed imparting useful heat to the bottoming-fluid. The steam-and-carbon-dioxide mixture can be cooled to a sufficiently low temperature, by heat exchange with bottoming-fluid, so that the stream of carbon dioxide and other non-condensible gases emerging from this heat exchange contains only a relatively small proportion of water vapor. By contrast, in an unmodified top heat cycle, it is usually not practicable to discharge non-condensible gases from the steam condenser which do not contain substantial amounts of water vapor; and, typically, more than ten per cent of the total steam is condensed from carbon dioxide in aftercoolers following stages of pumping of carbon dioxide (along with water vapor) from the condensing pressure to the atmosphere.

The increase in cycle efficiency afforded by incorporating a bottom heat cycle into the top heat cycle is greater the lower the temperature level of the available atmospheric cooling water, i.e., the lower the pressure in the bottoming-fluid condenser.

Presence of a bottom heat cycle, incorporated with a top heat cycle, provides opportunity to "scavenge" low-level sources of heat, putting them to use with production of incremental amounts of power, which might otherwise be useless to the operation of the unmodified top heat cycle.

A top heat cycle ordinarily incorporates a number of compressors—for air, fuel, gas, oxygen, etc. Incorporation of a bottom heat cycle affords greater flexibility in choice of the temperature level for after-coolers removing heat between compressor stages, since the heat may be transferred either to boiler feed water at a higher level or to bottoming-fluid at a lower level.

Some power stations have as their main function the meeting of peaks in electricity demand. Such stations operate at considerably below 100 percent load factor. Often, such stations are the older stations of an electricity-supply system, having thermal efficiencies considerably below the system average. Such a station may advantageously be modified, with use of a top heat cycle incorporating a bottom heat cycle and employing low-temperature rectification of air as a means of oxygen supply. The air-separation plant would work round-the-clock, consuming "off-peak" power supplied from other stations and storing oxygen at high pressure when demand for electricity is low. Thus, the air-separation plant is considerably smaller than would be needed for operation of the station at 100 percent load factor. Presence of the bottom heat cycle in the modified station is advantageous, since some of the heat of compression of air to the low-temperature rectification apparatus, as well as heat of compression of oxygen to storage, can be recovered in the form of work performed by the bottoming-fluid. Otherwise, heat developed by compression of air and oxygen during periods the station is not working to supply electricity would have to be thrown away to atmospheric cooling water, since no boiler-feed-water (BFW) is being heated to raise steam. Furthermore, the compressor and heat-exchanger arrangements which are most advantageous when aftercooling is done against atmospheric cooling water are not the most advantageous when compression heat is used to warm BFW. In the former instance, aftercooling and compression are conducted at as low a temperature as possible, while in the latter instance, overall system requirements generally demand that heat be added to BFW at a higher temperature level. Thus, in absence of the bottom heat cycle, a top heat cycle, working at considerably below 100 percent load factor and using low-temperature rectification of air is disadvantaged with respect to recovery of compression heat a large part of the time.

Many experts hold the opinion that nuclear steam-power plant will in the reasonably near future supply most of the base-load demand for electricity in many important geographical regions. This opinion is based upon recent developments which have markedly lowered both capital cost and fuel cost for nuclear plant. If this opinion is correct, the role of fossil fuel in these regions will be reduced to the meeting of intermediate and peak load demands. There will be need for plant using fossil fuel at low capital cost and preferably at high thermal efficiency. Such plant may be provided by incorporating an alternative top heat cycle, including a bottom heat cycle, into nuclear steam-power plant. Two sets of power-developing turbines would be provided: a conventional set of turbines for base-load purposes, and a top heat set of turbines "borrowing" steam from the conventional turbines during periods of peak demand for electricity. During off-peak hours, part of the electricity generated by the conventional turbines would be used to operate a low-temperature air-separation plant producing and storing oxygen. During peaks in demand, the output of electricity from the nuclear station could be approximately doubled by bringing the top heat turbines into action and by turning down the conventional turbines.

My improvement of the top heat cycle and its advantages will be more fully understood by reference to the accompanying drawings and the following description of the operation of the several alternatives illustrated.

FIG. 1 provides a general illustration of a top heat cycle working in cooperation with a bottom heat cycle in which the bottoming-fluid is simply boiled and introduced into the bottom heat turbine as a saturated vapor.

Figure 1:
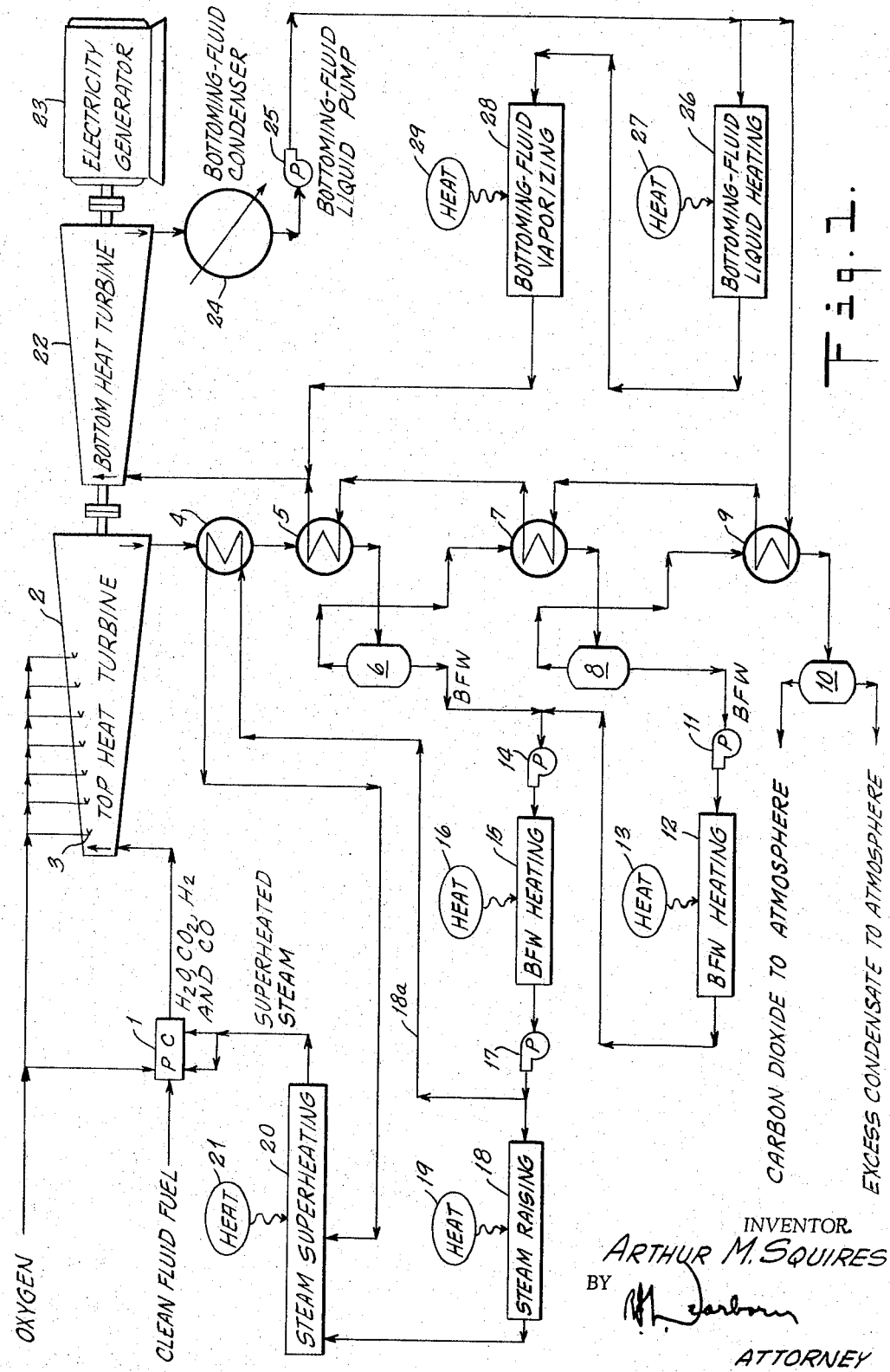

FIG. 1 provides a general illustration of my improved cycle. Clean fluid fuel, superheated steam, and oxygen are committed to partial combustor 1, which operates at a high pressure, say between about 1500 and 6000 p.s.i.a. Oxygen is supplied to partial combustor 1 in an amount insufficient for complete combustion of the clean fluid fuel, and effluent from partial combustor 1 consists of a mixture of steam, carbon dioxide, hydrogen, and carbon monoxide. The mixture is at a temperature substantially higher than can practicably be attained by the indirect transfer of heat to high-pressure steam across walls of pressure tubing. For example, the temperature of the mixture from partial combustor 1 might be 1460° F., or 1600° F., or indeed higher still. By the term "clean fluid fuel," I mean fuel substantially free of sulfur and ash substances and particulate matter. By "oxygen," I mean a gas containing oxygen as the primary component, preferably at a concentration of at least 95 mole percent.

Effluent from partial combustor 1 enters top heat expansion turbine 2, which is fitted with a series of internal nozzles 3, situated between rows of turbine blades, for the introduction of additional small quantities of oxygen at successive stages in the expansion process. Thus, combustion occurs within turbine 2, using up the fuel constituents hydrogen and carbon monoxide, and maintaining the temperature of the expanding gas stream at a level close to the temperature from partial combustor 1, through at least a portion of turbine 2.

Turbine 2 discharges gas (primarily steam, together with some carbon dioxide) at a pressure a little above atmospheric. The temperature of gas leaving turbine 2 is typically above 1200° F. in a well-designed top heat cycle. This gas is first cooled in heat-exchanger 4, by heat exchange against boiler-feed-water (BFW), to a temperature of the order of 500° F. or below. The gas is then cooled in heat-exchanger 5, by heat exchange with bottoming-fluid, which may be, for example, trichloromonofluoromethane—termed "refrigerant 11" by American Society of Heating, Refrigerating, and Air-Conditioning Engineers, and sold under the trade-name "Freon–11" or "F–11." A portion of the steam in the gas is condensed in heat-exchanger 5, and water is separated from gas in drum 6. The gas is further cooled in heat-exchanger 7, against bottoming-fluid, with additional condensation of steam. The additional water is separated from gas in drum 8, and the gas is further cooled in heat-exchanger 9, against bottoming-fluid, with additional condensation of steam. Condensate is separated from the residual gas in drum 10, excess condensate being discharged to the atmosphere. Uncondensed gas, consisting primarily of carbon dioxide, is also vented to the atmosphere. Sometimes a portion of this gas may advantageously be put to a chemical use—for example, a use described in my copending application Serial No. 337,900, viz., the gas may be compressed to a high pressure and combined with steam at that pressure to displace hydrogen sulfide from CaS·MgO.

The extent of cooling of steam and carbon dioxide passing through exchanger 7 is regulated so that condensate from drum 8, combined with condensate from drum 6, constitutes the amount of BFW needed to provide the superheated steam to partial combuster 1. Condensate from drum 8 is pumped in pump 11 and heated, in BFW-heating step 12 by addition of heat 13, approximately to the temperature of condensate from drum 6. Condensates from drums 6 and 8 are combined, pumped in pump 14, and heated in BFW-heating step 15 by addition of heat 16. Heated BFW is pumped in pump 17, and a portion is heated in steam-raising step 18 by addition of heat 19. A second portion is transferred through line 18a and is heated against steam and carbon dioxide in heat-exchanger 4, where BFW is vaporized to steam and may also be superheated. Steam from heat-exchanger 4 and from step 18 is superheated in step 20 by addition of heat 21.

Pump 14 raises BFW to a pressure such that it can receive heat 16 in step 15 without boiling. Pump 17 raises BFW to a pressure several hundred pounds per square inch (p.s.i.) higher than the desired pressure at the inlet to expansion turbine 2. Pump 11 need raise BFW only to the pressure necessary to overcome the pressure drop through BFW-heating step 12.

Bottoming-fluid vapor enters bottom heat expansion turbine 22 and is expanded in this turbine to the condensing pressure which is economically possible with use of the available atmospheric cooling water—or with use of air, if an air-cooled condenser is preferred.

Power developed by expansion turbines 2 and 22 is employed to drive electricity generator 23.

Effluent from turbine 22 is cooled in bottoming-fluid condenser 24 to effect complete condensation of bottoming-fluid. The cooling medium in condenser 24 is atmospheric cooling water or air. Liquiform bottoming-fluid is pumped in pump 25 to a pressure somewhat higher than the pressure at the inlet to turbine 22. The major portion of bottoming-fluid is heated in heat-exchangers 9, 7, and 5, by heat exchange against substantially-atmospheric-pressure steam and carbon dioxide from the top heat turbine 2. Bottoming-fluid leaves exchanger 5 in the vapor state. A minor portion of bottoming-fluid may be heated in step 26 by addition of heat 27, and vaporized in step 28 by addition of heat 29, and joined to vapor from exchanger 5.

A variety of sources of heat may be considered for items 13, 16, 19, 21, 27, and 29, viz., heat from combustion of a fuel with air, nuclear heat, geothermal sources of heat, waste heat from exhaust gases from a gas-turbine power plant, waste heat from exhaust gases from a magnetohydrodynamic device generating electricity, waste heat from a chemical process or a metallurgical operation, heat from arrangements for cooling turbine blades to permit higher turbine-inlet temperature, heat from an aftercooler removing heat of compression put into a gas by a compressor, and others.

A preferred source of heat for one or more of items 13, 16, 19, 21, 27, and 29 is waste heat from a process supplying oxygen to partial combustor 1 and to nozzles 3.

Typical clean fluid fuels which might be available for a power installation are natural gas, distillate fuels of a wide range of gravity, alcohols, and various byproduct gases (such as coke-oven gas, refinery gas, gas from an electrometallurgical operation) following removal of sulfur.

Most thermal power stations, however, must operate on "dirty" fuels, viz., coal or heavy residual fuel oil. Such dirty fuels may be converted to clean gaseous fuel by a variety of known means comprising a first operation in which the fuel is gasified to a raw fuel gas at high temperature, a second operation in which the raw fuel gas is cooled, and a third operation in which the raw gas is cleaned of sulfur compounds at a relatively low temperature. Heat from the second operation can be used for purposes 16, 19, 27, 29, and possibly 21 of FIG. 1. Many known means of removing sulfur compounds from fuel gas reject heat at temperature levels usable for purposes 13, 16, 27, and possibly 29. Plants providing a clean fuel will in general include apparatus for producing elemental sulfur from a stream rich in hydrogen sulfide, and waste heat from such apparatus is also a preferred source of heat for one or more of items 13, 16, 19, 21, 27, and 29.

In general, from the point of view of my new cycle, processes supplying oxygen or generating clean fuel will be preferred which reject waste heat at high temperature levels, and in small amounts, over processes which reject heat at low temperatures, and in large amounts. In other words, heat available at the level of 21 in FIG. 1 is more valuable than heat available at 16.

However, the presence of steps 26 and 28 in the improved cycle of the present invention provides greater opportunity for useful employment of low-level heat than is afforded by the unmodified top heat cycle of my copending application above referred to. Therefore, the advantage of using high-temperature methods of gas purification or oxygen recovery, by comparison with methods which reject heat at low temperatures, is somewhat lessened by introduction of the present improvement in the top heat cycle.

In an example based upon FIG. 1, I compared the use of trichloromonofluoromethane (F–11) as bottoming-fluid with an unmodified top heat example in which gases containing about 90.38 mole percent steam emerged from top heat turbine 2 at about 15.3 p.s.i.a. and were cooled to 480° F. in a heat-exchanger equivalent to heat-exchanger 4. In the unmodified top heat example used as a basis of comparison, gases from the heat-exchanger equivalent to heat-exchanger 4 were expanded in a turbine to 1.14 p.s.i.a. and 102.7° F., substantially dew-point conditions for the expanded gases. Steam was condensed from the gases, at 1.14 p.s.i.a. The residual gases were cooled to 90° F., and were compressed to the atmosphere in three stages of compression. Additional steam was condensed in an aftercooler (cooling the gases to 90° F.) situated following each of the first two compression stages.

In my example based upon FIG. 1, I kept the temperature of gases leaving heat-exchanger 4 at 480° F. I cooled the gases to 190° F. in heat-exchanger 5; to 168° F. in heat-exchanger 7; and to 120° F. in heat-exchanger 9. The temperature 168° F. was selected so that the combined condensate from drums 6 and 8 provided the BFW needed for the top heat circuit.

In my example based upon FIG. 1, I condensed trichloromonofluoromethane (F–11) at 23.6 p.s.i.a. and 100° F. in condenser 24. Operating at these conditions, condenser 24 is a much smaller and cheaper piece of equipment than the condenser required for the unmodified top heat example.

I pumped trichloromonofluoromethane (F–11) in pump 25 at 100° F. from 23.6 to 120 p.s.i.a., and heated and vaporized trichloromonofluoromethane (F–11) in exchangers 9, 7, and 5 to obtain a vapor at 190° F. and 91 p.s.i.a. entering bottom heat turbine 22. For heats 27 and 29 in steps 26 and 28, I used a relatively small amount of heat derived from the cooling of flue gas from 292° F. to 200° F., and also a relatively small amount of heat derived from the cooling of a high-pressure gas stream rich in hydrogen sulfide, water vapor, and carbon dioxide from 400° F. to 150° F.; these were heats used to heat BFW at low temperatures in the unmodified top heat example, and were no longer needed for that purpose.

The overall net effect of incorporating the above-described bottom heat cycle, in accordance with FIG. 1, was to reduce the heat rate (British Thermal Units of fuel consumed per kilowatt-hour of electricity sent out from the plant) of the unmodified top heat example by 0.2 percent. This reduction is not strikingly large, but it is remarkable in light of the losses of heat availability caused by the temperature drops across heat-exchangers 5, 7, and 9; and it is seen to be particularly worthwhile when it is considered that equipment for the foregoing example based upon FIG. 1 will cost less to build than equipment for the unmodified top heat example. No expensive vacuum pumps are needed, and the volume of fluid emerging from bottom heat turbine 22 is only about 8.5 percent of the volume of gases from the low-pressure, low-temperature turbine of the unmodified top heat example used as a basis of comparison. This decrease in gas volume is reflected by a decrease in size of turbine 22 and condenser 24, by comparison with the low-pressure turbine and the condenser of the unmodified top heat example.

In a second example based upon FIG. 1, I condensed trichloromonofluoromethane (F–11) at 18.28 p.s.i.a. and 86° F. In this second example, I used 191° F. and 92 p.s.i.a. as the conditions into bottom heat turbine 22. The overall net effect of incorporating the bottom heat cycle, by comparison with the unmodified top heat example used as a basis of comparison, was to reduce the heat rate by a little over 2 percent. This second example requires colder atmospheric cooling water than does the first example above, but the improvement in heat rate is greater than could be accomplished by adjusting the unmodified top heat example for use of the colder atmospheric water.

Figure 2:
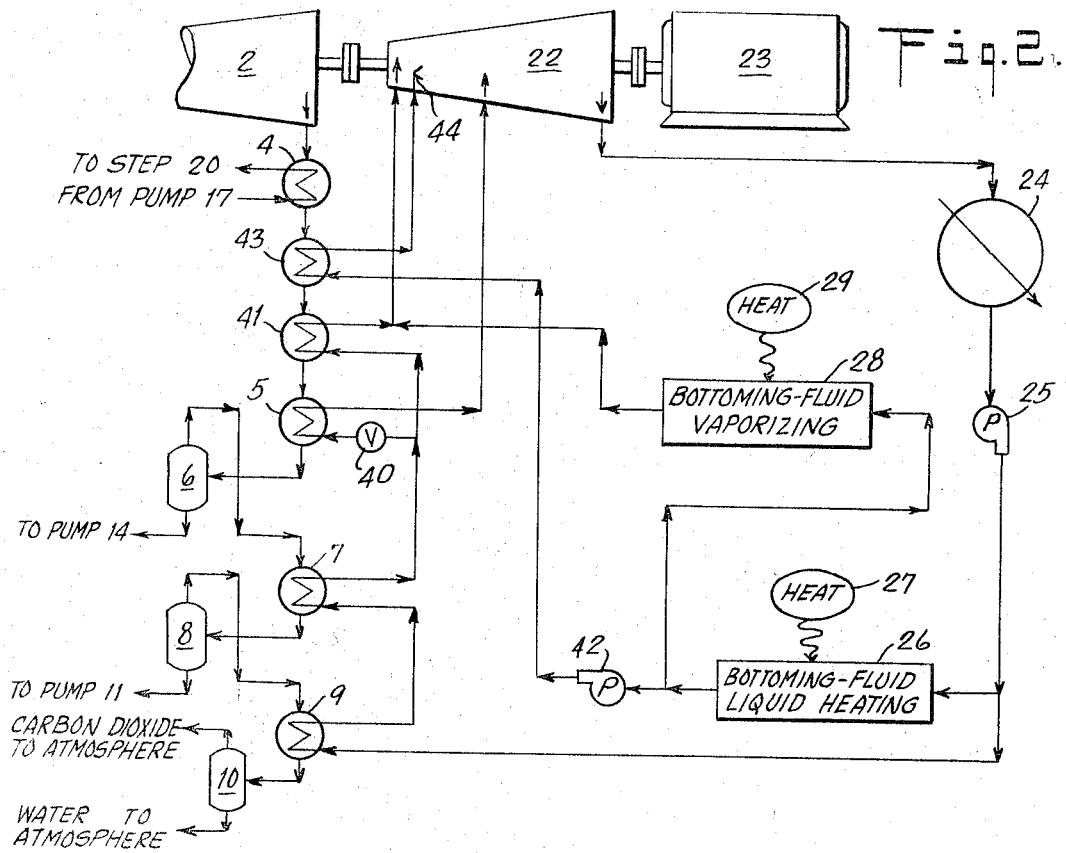
FIG. 2 illustrates a modification in which the bottoming-fluid is boiled at two temperature levels and in which a small amount of bottoming-fluid is injected in the form of a fine liquid mist into the inlet of the bottom heat turbine.

FIG. 2 shows an alternate arrangement of the bottom heat portion of the combined power cycle. Turbine 2 (only a part of which is shown in FIG. 2), heat-exchanger 4, drums 6, 8, and 10, and other elements of the top heat portion of the cycle (not shown in FIG. 2) function substantially in the same manner as corresponding items of FIG. 1, and will not again be described or discussed in complete detail.

In FIG. 2, steam-and-carbon-dioxide from heat-exchanger 4 is cooled in heat-exchangers 43, 41 and 5 against bottoming-fluid at three successively lower pressure levels in the three successive heat-exchangers. Use of heat-exchanger 43 is optional, and circumstances under which its use is desirable will be explained hereinafter. Water is separated from gas in drum 6, and gas is further cooled against bottoming-fluid in heat-exchanger 7. Water is separated from gas in drum 8, and gas is further cooled against bottoming-fluid in heat-exchanger 9.

Electricity generator 23, condenser 24, pump 25, and heating-and vaporizing-steps 26 and 28 function substantially in the same manner as corresponding items of FIG. 1, and will not again be described or discussed in detail. The major portion of liquiform bottoming-fluid from pump 25 is heated first in heat-exchangers 9 and 7, against steam and carbon dioxide. Following heat-exchanger 7, a portion of the bottoming-fluid is let down in pressure across valve 40 and is vaporized by heat exchange against steam and carbon dioxide in heat-exchanger 5. The remainder of the bottoming-fluid is vaporized at a higher pressure in heat-exchanger 41 by heat exchange against steam and carbon dioxide. Bottoming-fluid vapor from heat-exchanger 41 joins vapor from step 28 and is charged to bottom heat turbine 22. Bottoming-fluid vapor from heat exchanger 5 is introduced into turbine 22 at an intermediate point, where the expansion process has reduced the pressure to the level of vapor from heat-exchanger 5.

Optionally, a small portion of liquiform bottoming-fluid from step 26 may be pumped in pump 42 to a pressure somewhat higher than the pressure of bottoming-fluid vapor from heat-exchanger 41. This small portion of bottoming-fluid is heated in heat-exchanger 43 against steam and carbon dioxide, with the object of vaporizing just an amount sufficient to serve as atomizing gas for the injection via nozzle 44 of a quantity of liquiform bottoming-fluid, in the form of a fine mist, into bottom heat turbine 22 near the inlet. Use of the optional equipment items 42, 43, and 44 is desirable in the case of certain potentially useful bottoming-fluids having thermodynamic properties such that the expansion of their saturated vapors, in a power-developing expansion turbine, generally results in the discharge of a gas in a superheated condition. Examples of such fluids are trichloromonofluoromethane ("Freon–11"), trichlorotrifluoroethane ("Freon–113"), and dichlorotetrafluoroethane ("Freon–114"), among others. Use of one of these fluids along with the optional equipment items 42, 43, and 44 becomes relatively more desirable the greater the quantity of low-level heat 27 which is available for step 26.

The embodiment of FIG. 2 takes advantage of the fact that a considerable portion of steam is condensed from the substantially-atmospheric-pressure stream of steam and carbon dioxide when it is cooled only a few degrees of temperature below its dewpoint. Thus, in the foregoing examples based upon FIG. 1, the dewpoint of atmospheric-pressure gases containing about 90.38 mole percent steam is about 207° F. More than half of the steam is condensed when the gases are cooled to 200° F. Accordingly, in the foregoing examples based upon FIG. 1, a large amount of trichloromonofluoromethane (F–11) is boiled in heat-exchanger 5 at temperature differences of 10° F. and greater. But the first vaporization of trichloromonofluoromethane (F–11), in the foregoing examples, occurs at a temperature difference of about 5° F. The embodiment of FIG. 2 achieves an improvement in cycle efficiency by narrowing the average temperature difference for the boiling of bottoming-fluid.

In an example based upon FIG. 2 (and based upon the same unmodified top heat example used in the above-described examples resting upon FIG. 1), I used trichloromonofluoromethane (F–11) as bottoming-fluid, and I vaporized one-half of the liquid from pump 25 in heat-exchanger 5 at 190° F. and 91 p.s.i.a. I vaporized the other half of the liquid from pump 25 in step 28 and in heat-exchanger 41 at 197° F. and 98 p.s.i.a. I condensed trichloromonofluoromethane (F–11) at 100° F. and 23.6 p.s.i.a. I found the overall net effect of incorporating the bottom heat cycle was to reduce the heat rate of the unmodified top heat example by about 0.6 percent. This example did not use the optional equipment items 42, 43, and 44.

The modification illustrated by FIG. 2 is particularly attractive, by comparison with FIG. 1, if a bottoming-fluid is used which has a relatively high latent heat of vaporization by comparison with the heat needed to raise the temperature of liquiform bottoming-fluid from condenser 24 to the temperature at which it boils in heat-exchanger 5. An example of such a bottoming fluid is water. Use of water as a bottoming-fluid according to the arrangement of FIG. 1 results in poor cycle efficiency, but a satisfactory cycle efficiency is obtained with use of the arrangement of FIG. 2 (omitting optional items 42, 43, and 44). Water is not a particularly attractive bottoming-fluid from the standpoint of equipment cost, since bottom heat turbine 22 and condenser 24 must operate under vacuum. However, water may be preferred as a bottoming-fluid if one wishes to avoid introducing a new chemical species into the overall power installation. An advantage of a top heat power cycle, set forth in my co-pending application Serial No. 337,900, is that water is produced within the cycle by chemical reaction of hydrogen in the fuel with oxygen. This chemically-made water is of high purity, and may be recovered from drum 10 for use as a bottoming-fluid, if desired.

Figure 3:
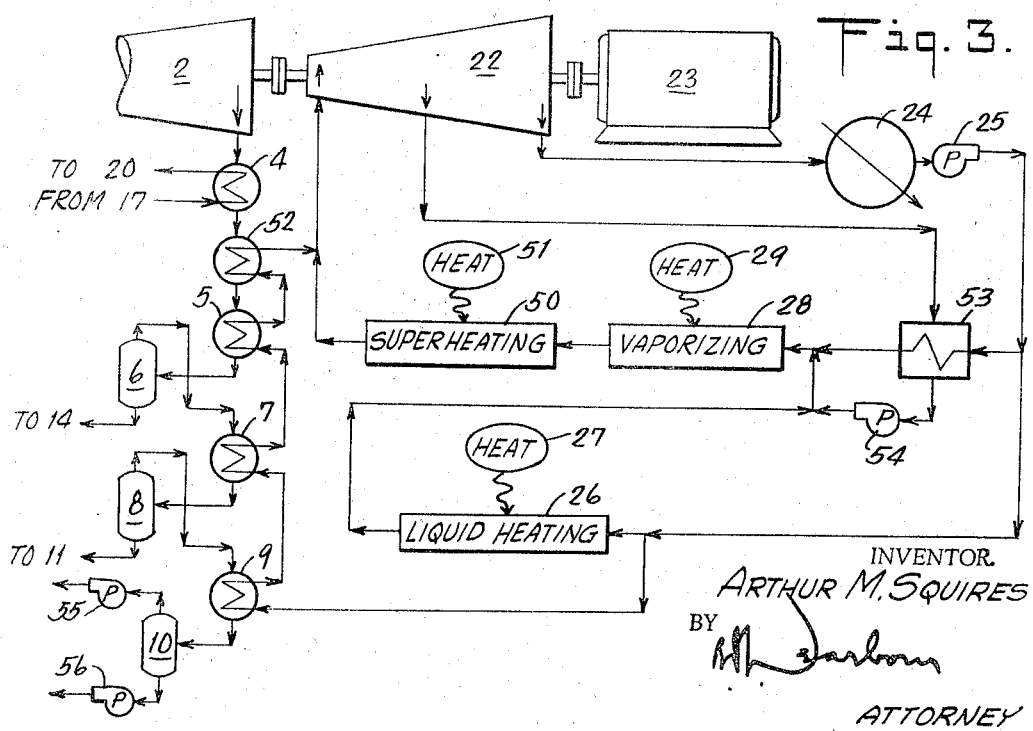
FIG. 3 illustrates a modification in which gasiform bottoming-fluid is superheated before it enters the bottom heat turbine.

FIG. 3 shows another alternate arrangement of the bottom heat portion of the combined power cycle. Turbine 2 (only a portion of which is shown in FIG. 3), heat-exchanger 4, drums 6, 8, and 10, and other elements of the top heat portion of the cycle (not shown in FIG. 3) function substantially in the same manner as corresponding items of FIG. 1, and will not again be described or discussed in complete detail.

In FIG. 3, steam and carbon dioxide from heat-exchanger 4 is first cooled in heat-exchanger 52 against gasiform bottoming-fluid, and then in heat-exchanger 5 against liquidform bottoming-fluid. Water is separated from gas in drum 6, and gas is further cooled against bottoming-fluid in heat-exchanger 7. Water is separated from gas in drum 8, and is further cooled against bottoming-fluid in heat-exchanger 9.

Gas and water are separated in drum 10. Optional vacuum pump 55 and water pump 56 are shown in FIG. 3, exhausting carbon dioxide and water respectively to the atmosphere, and are needed in case the pressure of these materials is below atmospheric pressure at the outlet of heat-exchanger 9. I believe that provision of vacuum pump 55 and water pump 56 is desirable for top heat plants employing high turbine-inlet temperatures, since in such plants it is probably desirable to expand steam and carbon dioxide to a pressure somewhat below atmospheric in top heat turbine 2.

Electricity generator 23, condenser 24, pump 25, and heating-and vaporizing-steps 26 and 28 function substantially in the same manner as corresponding items of FIG. 1, and will not again be described or discussed in detail. The major portion of liquiform bottoming-fluid from pump 25 is heated in heat-exchangers 9, 7, and 5 against steam and carbon dioxide. Gasiform bottoming-fluid is superheated in heat-exchanger 52.

Vapor from step 28 is superheated in step 50 by addition of heat 51. Advantageous sources of heat for heat 51 are similar to sources of heat already discussed in connection with heat items 13, 16, 19, 21, 27, and 29 of FIG. 1.

Superheated gasiform bottoming-fluid from heat-exchanger 52 and step 50 enters bottom heat expansion turbine 22 and is expanded to the pressure which can be economically maintained in condenser 24.

Optionally, a small portion of bottoming-fluid may be withdrawn from bottom heat turbine 22 at an intermediate stage in the expansion process and used to heat a minor portion of liquiform bottoming-fluid from pump 25 in heat-exchanger 53. Gasiform bottoming-fluid withdrawn from turbine 22 is condensed to a liquid in heat-exchanger 53, the liquid is pumped in pump 54, and is combined with liquid from the cold side of heat-exchanger 53 and with liquid from step 26. Use of optional items 53 and 54 is attractive if a bottoming-fluid is used which has a relatively low heat of vaporization by comparison with the heat needed to raise the temperature of liquiform bottoming-fluid from condenser 24 to the temperature at which it boils in heat-exchanger 5. Examples of such materials are dichlorodifluoromethane ("Freon–12"), monochlorodifluoromethane ("Freon–22"), and perfluorocyclobutane ("Freon–C318"). [It should be remarked that only the first two of the foregoing three substances advantageously lend themselves to use of superheat, in accordance with the arrangement of FIG. 3. Superheat is not advantageous for the third, however, which is of the class of substances having the property that the expansion of their saturated vapors, in a power-developing expansion turbine, generally results in the discharge of a gas in a superheated condition. Accordingly, if perfluorocyclobutane (F–C318) is used, it is advantageous to inject a quantity of liquid mist into the bottom heat turbine, in the manner discussed heretofore in connection with the use of optional equipment items 42, 43, and 44 of FIG. 2.]

Ammonia, sulfur dioxide, and dichloromonofluoromethane ("Freon–21") are examples of bottoming-fluids which give satisfactory results with use of the arrangement of FIG. 3. An example using ammonia, in which ammonia was superheated to 250° F. at 700 p.s.i.a and was condensed at 100° F. and 211.9 p.s.i.a, gave a slight improvement in heat rate from the unmodified top heat example used as a basis of comparison. Ammonia and sulfur dioxide have the advantage of displaying higher speeds of sound than the "Freons." Sulfur dioxide may be preferred as a bottoming-fluid in a top heat plant in which sulfur is recovered from a "dirty" fuel as elemental sulfur, in accordance with the teachings of my co-pending application referred to heretofore, since sulfur dioxide may be manufactured for use as bottoming-fluid from the power station's own sulfur supply.

Figure 4:
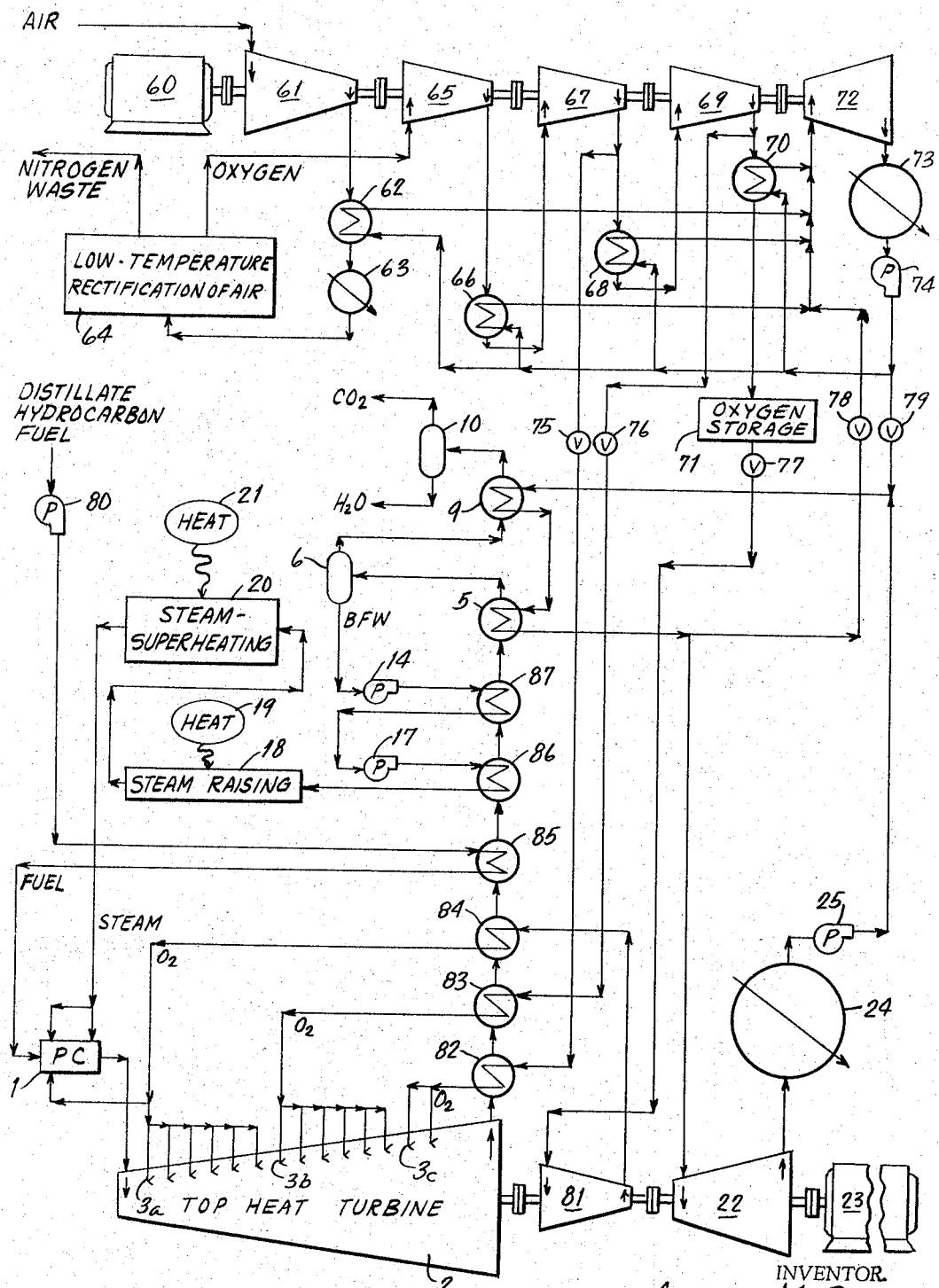
FIG. 4 illustrates an embodiment of the invention especially suited for operation at a load factor considerably below 100 percent. This embodiment illustrates the conversion of an existing steam-power station for use of the top heat cycle, or the use of a top heat cycle for peaking purposes in conjunction with nuclear plant.

FIG. 4 illustrates an embodiment of the improved cycle especially suited for operation at a load factor appreciably below 100 percent. The embodiment is also especially suited for installation alongside existing steam-raising equipment to work in cooperation with such equipment.

Certain equipment items in FIG. 4 function substantially in the same manner as corresponding items of FIG. 1, and will not again be described or discussed in complete detail. They are partial combustor 1; turbines 2 and 22; electricity generator 23; condenser 24; pumps 14, 17, and 25; drums 6 and 10; steam-raising and steam-superheating steps 18 and 20 employing heats 19 and 21; and heat-exchangers 5 and 9.

The operation of the arrangement shown in FIG. 4 will now be set forth as follows:

Air is compressed in compressor 61, typically to about 68 p.s.i.a., is cooled in heat-exchangers 62 (against bottoming-fluid) and 63 (against atmospheric cooling water), and is committed to known apparatus 64 for the low-temperature rectification of air. The rectification of air produces a waste stream of nitrogen and a product stream of oxygen, typically of about 95 percent purity, which is compressed in compressor stages 65, 67, and 69 from approximately atmospheric pressure to a pressure in the neighborhood of 700 p.s.i.a. Oxygen is cooled in heat-exchangers 66, 68, and 70 (against bottoming-fluid) following compressor stages 65, 67, and 69 respectively.

When the power station represented by FIG. 4 is not sending out electricity, valves 75, 76, and 77 are closed. Thus all oxygen produced by apparatus 64 is committed to oxygen storage 71, which may comprise either high-pressure storage cylinders or tanks, or underground storage space in porous rock formations having the integrity needful for the retention of gas, or underground cavern space excavated in hard rock, or sometimes advantageously in a high-pressure pipe-line which provides a connection by means of which oxygen may be interchanged among a number of stations of the type represented by FIG. 4.

Bottoming-fluid vapor from heat-exchangers 62, 66, 68, and 70 is expanded in power-developing expansion turbine 72, condensed in condenser 73 (against atmospheric cooling water), pumped in liquid state in pump 74, and returned to heat-exchangers 62, 66, 68, and 70. When the power station represented by FIG. 4 is not sending out electricity, valves 78 and 79 are also closed.

Electric motor 60 provides the major portion of power needed to drive air compressor 61 and oxygen compressor stages 65, 67, and 69. The remainder of the power is supplied by turbine 72. When the power station represented by FIG. 4 is not sending out electricity, FIG. 4 is a consumer of electricity to the extent of the demand by electric motor 60.

When demand arises for electricity from the station represented by FIG. 4, a liquiform distillate hydrocarbon fuel, preferably low in sulfur content, is pumped in pump 80 to a pressure several hundred p.s.i. higher than the pressure desired at the inlet of top heat turbine 2. Fuel is vaporized and heated, typically to around 700° F., in heat-exchanger 85 (against steam- and carbon-dioxide), and is committed to partial combustor 1 along with steam and oxygen. Oxygen is supplied to partial combustor 1 by opening valve 77, drawing oxygen from oxygen storage 71. This oxygen is compressed in compressor 81 to a pressure about 100 p.s.i. above partial combustor 1, and is heated in heat exchanger 84 (against steam-and-carbon-dioxide), typically to around 700° F. A portion of oxygen from heat-exchanger 84 is supplied to partial combustor 1, and a second portion is supplied to a plurality of nozzles 3a internal to top heat turbine 2. Each minor quantity of oxygen entering top heat turbine 2 via one of the nozzles 3a reacts by combustion with a portion of hydrogen and carbon monoxide in gases from partial combustor 1, thereby reheating the gases approximately to the temperature at which they left partial combustor 1. Additional such minor quantities of oxygen, performing a like role, are introduced into turbine 2 via a plurality of nozzles 3b and nozzles 3c at successively lower pressure levels. Oxygen to nozzles 3b is supplied by opening valve 76, drawing oxygen from the discharge of oxygen compressor stage 69; the oxygen is heated in heat-exchanger 83 (against steam-and-carbon-dioxide), typically to around 700° F. Oxygen to nozzles 3c is supplied by opening valve 75, drawing oxygen from the discharge of oxygen compressor stage 67; the oxygen is heated in heat-exchanger 82 (against steam-and-carbon-dioxide), typically to around 700° F.

Steam-and-carbon-dioxide from top heat turbine 2 is cooled in heat-exchangers 82, 83, and 84 (against oxygen); 85 (against hydrocarbon fuel); 86 (against high-pressure BFW); 87 (against low-pressure BFW); and 5 and 9 (against bottoming-fluid). The temperature of steam-and-carbon-dioxide leaving heat-exchanger 5 is controlled so that condensate from drum 6 provides the quantity of BFW needed to supply steam to partial combustor 1.

Oxygen compressor 81 receives power from turbine 2 or turbine 22. There may sometimes be an advantage in operating oxygen compressor 81, turbine 2, turbine 22, and electricity generator 23 at different speeds from one another. The arrangement of FIG. 4, where these items appear as if mounted upon a common shaft, should be considered schematic. Gear (not shown) for speed-reduction or speed-increase can be provided if there is advantage in not running the aforementioned items at a common speed, while still maintaining a transfer of power among the items as indicated in FIG. 4. Similarly, compressors 61, 65, 67, 69, and turbine 72 may sometimes advantageously be operated at various speeds through use of speed alteration gear (not shown).

When the station represented by FIG. 4 is sending out electricity, electric motor 60 may be supplied with electricity from electricity generator 23 if desired.

Because oxygen is withdrawn from the discharge of oxygen compressor stages 67 and 69, via valves 75 and 76, less heat is available to bottoming-fluid by heat exchange against oxygen in heat-exchangers 68 and 70. Accordingly, less bottoming-fluid vapor is available to turbine 72 from these exchangers. The loss of bottoming-fluid vapor to turbine 72 is made good by opening valve 78, withdrawing a minor quantity of bottoming-fluid vapor raised in heat-exchangers 9 and 5. An equal weight of liquiform bottoming-fluid is returned from the discharge of pump 74 to heat-exchanger 9 by opening valve 79. In this way, turbine 72 may be kept operating at full load.

I now give a numerical example based upon FIG. 4. The example used an existing steam boiler for steps 18 and 20. The existing boiler is part of an existing conventional steam-power station generating 239, 260 kw. of electricity. The boiler presently receives 1,559,000 lbs. per hour of high-pressure BFW at 470.1° F., and delivers 1,559,000 lbs. per hour of steam at 2415 p.s.i.a. and 1000° F. The heat-absorption for this duty is 1570.2 millions of B.t.u. per hour. The existing boiler also has a reheat section, which reheats 1,392,102 lbs. per hour of 542 p.s.i.a. steam from 632.2° F. to 1000° F. at 488 p.s.i.a. The heat-absorption for this reheat duty is 285.5 millions of B.t.u. per hour. The condenser of the existing station operates at 1.0 inch of mercury absolute (79.1° F.). BFW is presently heated from 79.1° F. to 470.1° F. by means of seven BFW heaters of the regenerative type, receiving steam bleeds abstracted from the existing conventional steam turbines. The main BFW pump is situated after the fifth heater (counting the heaters in order of increasing temperature level), taking water at 98 p.s.i.a. and 326.3° F. and delivering water at 3020 p.s.i.a. and 334.5° F.

For convenience in calculating my numerical example based upon FIG. 4, I used oxygen of 100 percent purity, although I used a pressure and quantity of air entering air-rectification aparatus 64 appropriate to production of oxygen of only 95 percent purity. The calculation was much easier with assumption of 100 percent purity, and the result is not much impaired as an illustration of the utility and worth of the invention.

In the example, I used as fuel a light hydrocarbon liquid having a higher heating value of 20,913.3 B.t.u. per pound.

EXAMPLE

Fuel was pumped to 2700 p.s.i.a. and heated to 700° F. ahead of partial combustor 1. Steam was supplied to partial combustor 1 at 2415 p.s.i.a. and 1000° F. Oxygen was compressed to 2500 p.s.i.a. and heated to 700° F. ahead of partial combustor 1 and nozzles 3a. Oxygen was supplied to nozzles 3b and 3c at 700° F. Pressures at discharge of oxygen compressor stages 65, 67, and 69 were 60.3, 206.3, and 728.3 p.s.i.a. respectively. Oxygen was withdrawn from storage 71 at 350 p.s.i.a. Gases from partial combustor 1 were at 2400 p.s.i.a. and 1460° F., and the gases were reheated to 1460° F. at each of nozzles 3a, 3b, and 3c. The pressure at the last nozzle 3c was 125.6 p.s.i.a., and the pressure at the outlet of top heat turbine 2 was 15.3 p.s.i.a. Gases from turbine 2 contained 5.675 volume percent carbon dioxide, and their temperature was 872° F. These gases were cooled to 861° F. in heat-exchangers 82, 83, and 84; to 824° F. in heat-exchanger 85; to 304° F. in heat-exchangers 86 and 87; to 183° F. in heat-exchanger 5 (with condensation of 1,559,000 lbs. per hour of BFW); and to 110° F. in heat-exchanger 9. Air was cooled to 140° F. in heat-exchanger 62, and oxygen was cooled to 150° F. in heat-exchangers 66, 68, and 70. Bottoming-fluid was trichloromonofluoromethane (F–11). It entered turbines 22 and 72 at 197° F. and 99 p.s.i.a., and was condensed in condensers 24 and 73 at 80° F. and 16.3 p.s.i.a. It entered condensers 24 and 73 in a superheated condition, at 84.5° F.

The example sent out electricity 50 percent of the time; that is to say, turbines 2 and 22 and electricity generator 23 functioned 12 hours on and 12 hours off out of each 24 hours. Equipment 60 through 74 inclusive fuctioned 24 hours out of 24 hours.

I used only the primary steam-raising and steam-superheating portion of the existing boiler, and dismantled the reheat section of the boiler. Accordingly, the summation of heat duties 19 and 21 for steam-raising and steam-superheating steps 18 and 20 respectively amounted to 1570.2 millions of B.t.u. per hour; and the firing rate of the boiler was reduced to $$\frac{1570.2}{1570.2 + 285.5} \times 100 = 84.615 \text{ percent}$$

of the existing firing rate. I assumed that the thermal efficiency of utilization of fuel by the existing boiler remained constant during this reduction in firing rate. [Notice that it is immaterial to my example what fuel is presently used in the existing boiler.] I continued to operate the existing main BFW pump (i.e., pump 17 in FIG. 4) at the existing conditions. Accordingly, heat-exchanger 87 replaced the first five existing regenerative BFW heaters, and heat-exchanger 86 replaced the last two.

The following tabulation lists stream flow quantities, knowledge of which is necessary for understanding my example:

| Stream flow quantities: | Quantities in pounds per hour |
|---|---|
| Hydrocarbon fuel | 80,971 |
| Steam to partial combustor 1 | 1,559,000 |
| Oxygen to partial combustor 1 | 146,729 |
| Oxygen to nozzles 3a | 60,251 |
| Oxygen to nozzles 3b | 60,251 |
| Oxygen to nozzles 3c | 20,084 |
| Condensate from drum 10 | 111,719 |
| Carbon dioxide from drum 10 (including 9,600 lbs. per hr. of water vapor) | 256,567 |
| Trichloromonofluoromethane (F–11) to turbine 22 | 19,185,000 |
| Trichloromonofluoromethane (F–11) to turbine 72 | 781,100 |
| Oxygen into storage 71 during the 12 hours in which the example was not sending out electricity | 143,657 |

The following data show a first calculation of the heat rate and thermal efficiency of the example, expressed in terms of the incremental power for which the combustion of light hydrocarbon fuel with oxygen was responsible:

First calculation of thermal efficiency:
| | |
|---|---|
| Higher heating value of light hydrocarbon fuel input | 1,693,370,000 B.t.u. per hr. |
| Net kilowatts of shaft work produced during the 12 hours in which the example was sending out electricity, and assuming that electric motor 60 was supplied from electricity generator 23 | 488,100 kw. |
| Allowance for condensing water pump, other auxiliaries, losses, etc. | 13,200 kw. |
| Net kilowatts sent out by the example during the aforementioned 12 hours | 474,900 kw. |

First calculation of thermal efficiency:—Continued
　Kilowatts assignable to fuel burned
　　in existing boiler at 84.615 percent of presently existing firing
　　rate=239,260×0.84615= _____ 202,450 kw.
　Net kilowatts assignable to combustion of light hydrocarbon fuel ___ 272,450 kw.
　Heat rate for electricity assignable to combustion of hydrocarbon fuel=

$$\frac{1{,}693{,}370{,}000}{272{,}450} = 6215.3 \text{ B.t.u. per kwh. sent out}$$

Thermal efficiency corresponding to aforementioned heat rate=

$$\frac{3412.75}{6215.3} \times 100 = 54.9 \text{ percent}$$

Notice should be taken that the foregoing first calculation of heat rate and thermal efficiency does not allow for the consumption of electricity by electric motor 60 during the 12 hours in which the plant was not sending out electricity. The following data show a second calculation of heat rate and thermal efficiency in which this is taken into account.

Second calculation of thermal efficiency:
　Net kilowatts assignable to combustion
　　of light hydrocarbon fuel during 12
　　hours in which example was sending
　　out electricity (see first calculation
　　above) _____ 272,450 kw.
　Consumption of electricity by electric
　　motor 60 during 12 hours in which
　　example was not sending out electricity; this electricity was supplied from
　　the outside _____ 23,200 kw.
　Net kilowatts assignable to combustion
　　of light hydrocarbon fuel on a 24-
　　rour basis _____ 249,250 kw.
　Heat rate for electricity assignable to
　　combustion of hydrocarbon fuel=

$$\frac{1{,}693{,}370{,}000}{249{,}250} = 6793.9 \text{ B.t.u. per kwh. sent out}$$

Thermal efficiency corresponding to aforementioned heat rate=

$$\frac{3412.75}{6793.9} \times 100 = 50.2 \text{ percent}$$

An expert in power-system economics will recognize that the first thermal efficiency calculation above is more meaningful than the second as a reflection of the economy of usage of the light hydrocarbon fuel. During the 12 hours in which the example was not sending out electricity, electric motor 60 was consuming "off-peak," base-load electric power, which from the economic standpoint has a far lower value than the last increment of electricity which a power system must supply during peaks in demand.

Those skilled in the art will readily see ways of modifying the example of FIG. 4 to use natural gas or a clean gaseous fuel manufactured from a "dirty" fuel, such as heavy residual oil or coal. They will also recognize the merits of providing equipment of the type exemplified by FIG. 4 to be available alongside a nuclear steam-power station, to "borrow" steam from the nuclear station during peaks in demand, and thereby to accomplish a large increase in output from the nuclear station at such times. They will also recognize that higher thermal efficiencies can be attained by using a higher top heat turbine temperature than the 1460° F. level of the foregoing example. Moreover, use of higher top heat turbine temperature leads to a greater increase in electricity-generating capacity of an existing steam-power station modified along the lines of FIG. 4. I do not wish my ideas to be limited with respect to top heat turbine temperature level.

In geographical regions of dense population and high concentration of industry, provision of a network of oxygen-distributing pipe-lines would contribute toward the utility of the ideas examplified by FIG. 4. Oxygen-manufacturing apparatus could then be situated at base-load power stations, and could supply oxygen via pipe-lines to peak-load stations employing top heat and bottom heat turbines which are strategically situated with respect to the electricity-distribution grid and with respect to electricity demand. For a number of years, an existing power system may acquire incremental peak-load station capacity through modification of existing steam stations along the lines of the example of FIG. 4. Advantageously, also, a network of fuel-gas-distributing pipe-lines could parallel the oxygen-distributing pipe-lines, the fuel gas being manufactured from "dirty" fuels at a few strategically located plants which operate around-the-clock. When the storage-capabilities of fuel-gas- and oxygen-pipe-lines are taken into account, such pipe-lines working in cooperation with a number of top heat plants may be recognized as extremely effective means of distributing energy when demand for energy goes through wide fluctuations. Oxygen may advantageously be distributed from a pipe-line to industrial consumers of oxygen.

I do not wish my invention to be limited to the particular embodiments of the accompanying fiures. I have mentioned a number of suitable bottoming-fluids, but I do not wish my invention to be limited solely to the use of these particular fluids. Those skilled in the art will recognize the thermodynamic properties which are desirable for a bottoming-fluid. A particular bottoming-fluid which is most attractive for one situation may not be the most attractive for another. Choice of a bottoming-fluid in a particular situation will depend upon the temperature levels at which heat is available from the top heat portion of the cycle to the bottom heat portion of the cycle. The choice will depend particularly upon the relative amounts of steam and non-condensible gases leaving the top heat turbine and the pressure at the outlet of this turbine. Cost factors will enter into the choice, both for equipment and for supply of bottoming-fluid.

Only such limitations should be imposed as are indicated in the appended claims.

I claim:

1. In a top heat power cycle of the type which includes the steps of pumping an initial quantity of liquid water to a high pressure, adding a first portion of heat to said water indirectly across heat-transfer surface, adding a second portion of heat directly in form of products from the combustion of a clean fluid carbonaceous fuel with oxygen and expanding the resulting hot gases through power-developing expansion turbine means, the improvement which comprises adding a bottom heat power cycle including the additional steps: pumping a liquiform bottoming-fluid, cooling said expanded gases from said power-developing expansion turbine means by an indirect heat exchange against said pumped bottoming-fluid, thereby heating and boiling said bottoming-fluid and at the same time condensing water from said expanded gases, separating liquid water from said gases, deriving said initial quantity of liquid water from said separated water and pumping said initial quantity of liquid water to said high pressure to repeat said top heat power cycle, expanding the bottoming-flud vapor through a power-developing expansion turbine, condensing bottoming-fluid effluent from said turbine, and pumping liquiform bottoming-fluid to repeat said bottom heat power cycle.

2. In a top heat power cycle of the type which includes the steps of pumping an initial quantity of liquid water to a high pressure, adding a first portion of heat to said water indirectly across heat-transfer surface, adding a second portion of heat directly in form of products from the combustion of a clean fluid carbonaceous fuel with oxygen, expanding the resulting hot gases through power-developing expansion turbine means, and cooling said expanded gases by a first indirect heat exchange thereby supplying at least a part of said first portion of heat, the improvement which comprises adding a bottom heat power cycle including the additional steps: pumping a liquiform bottom-fluid, further cooling said expanded gases by a second indirect heat exchange against said pumped bottoming-fluid, thereby heating and boiling said bottoming-fluid and at the same time condensing water from said expanded gases, separating liquid water from said gases, deriving said initial quantity of liquid water from said separated water and pumping said initial quantity of liquid water to said high pressure to repeat said top heat power cycle, expanding the bottoming-fluid vapor through a power-developing expansion turbine, condensing bottoming-fluid effluent from said turbine, and pumping liquiform bottoming-fluid to repeat said bottom heat power cycle.

3. The power cycle of claim 2 in which said bottoming-fluid is a substance having a critical temperature above about 200° F.

4. The power cycle of claim 2 in which said second indirect heat exchange is arranged so that gases separated from liquid water following said heat exchange contain only a minor portion of water vapor.

5. The power cycle of claim 2 in which said power-developing expansion turbine means discharges gases at a pressure not greater than a few p.s.i. above atmospheric pressure.

6. The power cycle of claim 2 in which gases separated from liquid water following said second heat exchange are at sub-atmospheric pressure and are exhausted to the atmosphere.

7. The power cycle of claim 2 in which said bottoming-fluid is trichloromonofluoromethane (F–11).

8. The power cycle of claim 2 in which said bottoming-fluid is trichlorotrifluoroethane (F–113).

9. The power cycle of claim 2 in which said bottoming-fluid is dichlorotetrafluoroethane (F–114).

10. The power cycle of claim 2 in which said bottoming-fluid is sulfur dioxide.

11. The power cycle of claim 2 in which said bottoming-fluid is dichloromonofluoromethane (F–21).

12. The power cycle of claim 2 in which said bottoming-fluid is ammonia.

13. The power cycle of claim 2 in which said bottoming-fluid is selected from the group comprising trichloromonofluoromethane (F–11), trichlorotrifluoroethane (F–113), and dichlorotetrafluoroethane (F–114) and in which a small quantity of bottoming-fluid is injected as a liquid mist into said bottoming-fluid expansion turbine.

14. The power cycle of claim 2 in which said bottoming-fluid is selected from the group comprising ammonia, sulfur dioxide, and dichloromonofluoromethane (F–21), and in which said bottoming-fluid is superheated before its expansion in said bottoming-fluid expansion turbine.

15. In a top heat power cycle of the type which includes the steps of pumping an initial quantity of liquid water to a high pressure, adding a first portion of heat to said water, adding a second portion of heat directly in form of products from the combustion of a clean fluid carbonaceous fuel with oxygen, expanding the resulting hot gases through a first power-developing expansion turbine means, cooling said expanded gases by a first indirect heat exchange thereby supplying at least a part of said first portion of heat, compressing air to a pressure of at least several atmospheres, cooling said air by a second indirect heat exchange, committing said air to apparatus for the liquefaction and rectification of air at low temperature, and supplying oxygen from said apparatus to said combustion, the improvement which comprises adding a bottom heat power cycle including the additional steps: pumping a liquiform bottoming-fluid, heating and boiling a first portion of said pumped bottoming-fluid by said second indirect heat exchange, further cooling said expanded gases by a third indirect heat exchange against a second portion of said pumped bottoming-fluid, thereby heating and boiling said second portion of bottoming-fluid and at the same time condensing water from said expanded gases, separating liquid water from said gases, deriving said initial quantity of liquid water from said separated water and pumping said initial quantity of liquid water to said high pressure to repeat said top heat power cycle, expanding bottoming-fluid vapor resulting from said second and third indirect heat exchanges through a second power-developing expansion turbine means, condensing bottoming-fluid effluent from said means, and pumping liquiform bottoming-fluid to repeat said bottom heat power cycle.

16. The power cycle of claim 15 in which at least a part of said first portion of heat is supplied by a nuclear reaction.

17. The power cycle of claim 15 including accumulating and storing oxygen at high pressure in storage means during time periods when said first power-developing expansion turbine means are idle, in which said second power-developing expansion turbine means comprise at least two independent turbines, one taking bottoming-fluid vapor primarily from said second indirect heat exchange and one taking bottoming-fluid vapor primarily from said third indirect heat exchange, and withdrawing oxygen from said storage means and supplying said oxygen to said combustion during time periods when said first power-developing expansion turbine means are in use.

18. A cycle of the Rankine type which comprises the following steps: employing as cycle fluid a fluid having a critical temperature between 200° F. and 500° F., receiving heat in said fluid primarily from the condensation of steam out of a mixture consisting of steam and non-condensible gases comprising primarily carbon dioxide, said mixture being generated by combining steam with products of combustion of a fuel with substantially pure oxygen, and rejecting heat from said fluid to atmospheric cooling water, said mixture having a pressure within a few p.s.i. of atmospheric.

19. Apparatus for generating power in a cycle of the Rankine type which comprises means for employing as a cycle fluid a fluid having a critical temperature between 200° F. and 500° F., means for receiving heat in said fluid primarily from the condensation of steam out of a mixture consisting of steam and non-condensible gases comprising primarily carbon dioxide, said mixture being generated by combining steam with products of combustion of a fuel with substantially pure oxygen, and means for rejecting heat from said fluid to atmospheric cooling water, said mixture having a pressure within a few p.s.i. of atmospheric.

20. In apparatus for generating power in a top heat power cycle of the type which includes means for pumping an initial quantity of liquid water to a high pressure, means for adding a first portion of heat to said water indirectly across heat-transfer surface, means for adding a second portion of heat directly in form of products from the combustion of a clean fluid carbonaceous fuel with oxygen, power-developing expansion turbine means for expanding the resulting hot gases, and means for cooling said expanded gases by a first indirect heat exchange thereby supplying at least a part of said first portion of heat, the improvement which comprises apparatus for generating power in a bottom heat power cycle including: means for pumping a liquiform bottoming-fluid, means for further cooling said expanded gases by a second indirect heat exchange against said pumped bottoming-fluid, thereby heating and boiling said bottoming-fluid and at the same time condensing water from said expanded gases, means for separating liquid water from said gases, means of deriving said initial quantity of liquid water from said separated water and of pumping said initial quantity of liquid water to said high pressure to repeat said top heat power cycle, a power-developing expansion turbine for expanding the bottoming-fluid vapor, means of condensing bottoming-fluid effluent from said turbine, and means of pumping liquiform bottoming-fluid to repeat said bottom heat power cycle.

References Cited by the Examiner

UNITED STATES PATENTS

| | | | |
|---|---|---|---|
| 883,487 | 3/1908 | Robson | 60—38 |
| 2,832,194 | 4/1958 | Kuhner | 60—39.18 |

MARK NEWMAN, *Primary Examiner.*

RALPH D. BLAKESLEE, *Examiner.*